(No Model.)
H. M. FORDHAM.
ATTACHMENT FOR SEED DRILLS.
No. 245,474. Patented Aug. 9, 1881.
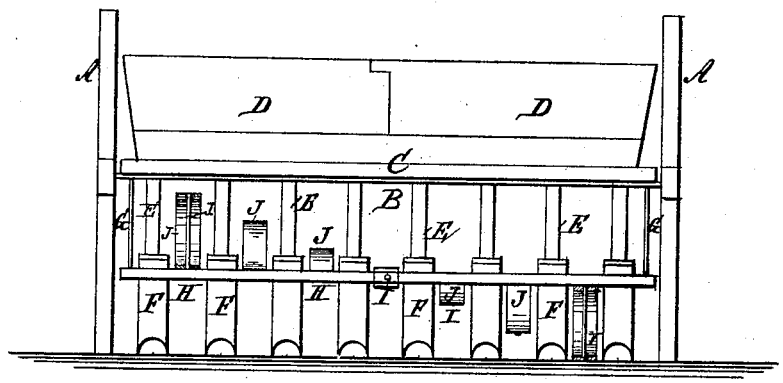
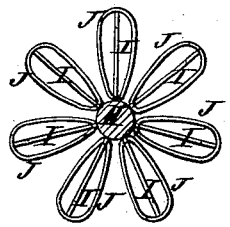
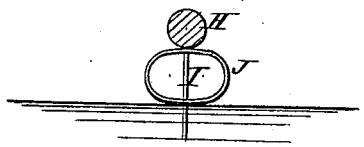
WITNESSES:
INVENTOR:
H. M. Fordham
BY Munn & Co.
ATTORNEYS.

UNITED STATES PATENT OFFICE.

HOWARD M. FORDHAM, OF GREAT BEND, KANSAS.

ATTACHMENT FOR SEED-DRILLS.

SPECIFICATION forming part of Letters Patent No. 245,474, dated August 9, 1881.

Application filed April 8, 1881. (No model.)

*To all whom it may concern:*

Be it known that I, HOWARD M. FORDHAM, of Great Bend, in the county of Barton and State of Kansas, have invented a new and Improved Attachment for Seed-Drills, of which the following is a specification.

Figure 1 is a rear view of my improvement, shown as applied to a seed-drill. Fig. 2 is a sectional elevation of the attachment. Fig. 3 is a sectional elevation of the attachment, illustrating the operation of the springs when the rods enter the ground.

Similar letters of reference indicate corresponding parts.

The object of this invention is to keep the feet of drills and seeders free from rubbish.

The invention consists in constructing an attachment for seed-drills with a rotary shaft, spirally-arranged rods attached to the shaft to pass between the drill-feet and push off collected rubbish, and springs placed upon the rods to keep them clear of rubbish, as will be hereinafter fully described.

A represents the wheels, B the axle, C the frame, D the seed-box, E the delivery-tubes, and F the feet, of a drill, about the construction of which parts there is nothing new.

To the frame C are attached brackets or hangers G, to the lower ends of which are journaled the ends of a shaft, H. The shaft H is placed in the rear of the feet F, and to it are attached radial arms or rods I, which are arranged spirally and in such a manner as to pass successively through the successive spaces between the feet F. The ends of the rods I pass through the center of springs J, the ends of which are attached to the shaft H.

With this construction, as the machine is drawn forward one of the rods I enters the ground and rotates the shaft H so far as to bring the next rod I in contact with the ground, which, in turn, enters the ground and rotates the shaft, and so on. As each rod I enters the ground the next rod I passes between the next two feet F and pushes off any grass, weeds, or other rubbish that may have collected upon them. As each rod I enters the ground the bend of its spring J comes in contact with the ground and is pushed upward, as shown in Fig. 3. As the rod I leaves the ground the elasticity of the spring J forces its middle part or bend downward to the end of the rod, pushing off any rubbish that may be upon the rod. In this way the rods I are kept clear, and the rubbish is prevented from winding around the shaft H and clogging it.

If desired, the rotary shaft H may be driven from the wheel A or axle B by a band and pulleys, so as to be rotated with a positive movement.

Having thus fully described my invention, I claim as new and desire to secure by Letters Patent—

1. An attachment for seed-drills, constructed substantially as herein shown and described, consisting of the shaft H, the radial rods I, arranged spirally around the shaft, and the clearing-springs J, as set forth.

2. In an attachment for seed-drills, the combination, with the spirally-arranged radial rods I, attached to the rotary shaft H, of the springs J, substantially as herein shown and described, whereby the said rods are kept clear of rubbish, as set forth.

HOWARD MILTON FORDHAM.

Witnesses:
FRANK MILLARD,
GEORGE A. LAW.